United States Patent [19]

Shepherd

[11] 4,178,811
[45] Dec. 18, 1979

[54] META REINFORCED PLASTIC DAMPER HUB

[75] Inventor: Michael Shepherd, Indianapolis, Ind.

[73] Assignee: Wallace Murray Corporation, New York, N.Y.

[21] Appl. No.: 806,709

[22] Filed: Jun. 15, 1977

[51] Int. Cl.² .......................................... F16F 15/00
[52] U.S. Cl. ..................... 74/574; 64/1 V; 29/159.3; 188/17; 188/1 B
[58] Field of Search ............... 74/574; 188/1 B, 17, 188/18 R, 114; 64/1 V, 11, 12, 13; 29/159.3, 436, 149.5 NM

[56] References Cited

U.S. PATENT DOCUMENTS

| | | | |
|---|---|---|---|
| 2,216,455 | 10/1940 | Piron | 29/436 |
| 3,020,036 | 2/1962 | Kleinschmidt | 64/11 R X |
| 3,361,484 | 1/1968 | Frank | 29/159.3 X |
| 3,545,301 | 12/1970 | Richter | 74/574 |
| 3,901,101 | 8/1975 | McGavern | 74/574 |
| 4,033,642 | 7/1977 | Sorgatz et al. | 74/574 X |
| 4,049,985 | 9/1977 | Sudler | 310/49 R |

FOREIGN PATENT DOCUMENTS

| | | | |
|---|---|---|---|
| 492433 | 9/1938 | United Kingdom | 74/574 |
| 644527 | 10/1950 | United Kingdom | 64/13 |
| 835314 | 5/1960 | United Kingdom | 74/574 |

Primary Examiner—Samuel Scott
Assistant Examiner—Don E. Ferrell
Attorney, Agent, or Firm—Thomas J. Greer, Jr.

[57] ABSTRACT

A torsional vibration damper of the type having an outer inertia ring, a radially intermediate elastomer annulus, and a radially innermost hub. The polar moment of inertia of the entire damper is reduced by forming the hub of a low density material such as aluminum or plastic. The specific improvement resides in metal reinforcing members molded or otherwise inserted into the hub, thus overcoming material weakness and the phenomenon of creep in the plastic.

7 Claims, 2 Drawing Figures

META REINFORCED PLASTIC DAMPER HUB

This invention relates to torsional vibration dampers of the type having a hub secured to an outer inertia member by an elastomer annulus and is an improvement on the construction disclosed in my co-pending application Ser. No. 667,975, filed Mar. 18, 1976 entitled, Plastic Hub Torsional Vibration Damper, hereby incorporated by reference.

The invention exhibits particular utility to the damping of torsional vibrations in internal combustion engines. Such dampers are generally classified at present in Class 74, Subclass 574 in the U.S. Patent Office. Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly where one of the resonant frequencies of the crankshaft coincides with the particular firing induced, excitation frequency of the engine. According to present theory of elastomer vibration dampers, the torsional vibrational energy transmitted to the crankshaft by the action of the pistons is converted into heat in the elastomer. The damper may accordingly be considered as a drain or sump which continually receives a portion of the energy which causes torsional vibrations.

A common form of such a damping device includes an outer or inertia member is the form of a ring or annulus of some significant mass. The inner portion of this ring is attached to an elastomer annulus which, in turn, is secured to a hub or other element in turn attached to the rotating crankshaft of an engine. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 r.p.m. simultaneously executes angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper also prevents breakage of the crankshaft as well as inhibiting vibration of various other components of the internal combustion engine.

Prior torsional vibration constructions of the type having a hub, elastomer member, and inertia member or ring have generally employed materials of relatively high density for both the hub and the inertia member. The relatively high density and accompanying relatively high polar moment of inertia of the inertia member is a desirable feature; the hub employed only more or less as a coupling between the shaft and the inner radial portion of the elastomer annulus. However, the use of high density material such as cast iron for the hub may result in undesirable effects. Thus, whenever any rotary mass, such as a torsional vibration damper, is added to the crankshaft of an engine, the resonant frequency of that crankshaft is lowered. Such lowering may bring critical resonant vibration orders of the crankshaft near or within the operating range of speeds of the engine.

An internal combustion engine has, in general, an operating range, as for example, from 1000 to 4500 r.p.m. Within this range there is a corresponding range of firing induced, excitation frequencies. These excitation frequencies, as earlier noted, induce torsional vibrations on the crankshaft. If a natural resonant frequency of the crankshaft is above the excitation frequencies of the engine within the normal operating speed range, large torsional amplitudes in the crankshaft will in general not occur. Contrariwise, if a resonant frequency of the crankshaft is within the engine firing frequencies, large angular vibration amplitudes may arise.

It will now be apparent to the reader that the inertia of a rotary mass fixed to the crankshaft, for the purpose of completing a typical damper assembly, should be as low in polar moment of inertia as possible. In this way, the crankshaft resonant frequencies may, in certain applications, be maintained as far as possible from the engine firing related frequencies.

According to the disclosure of my notec co-pending application, the hub may be formed of plastic to reduce its parasitic mass, with consequent enjoyment and improvement of damper behavoir fully described therein. The present invention comprehends a composite hub formed of plastic, aluminum, or other low density material, suitably reinforced by rigid members, such as steel or cast iron hoops, embedded in the hub. Such a construction permits the use of a wide range of plastic materials.

IN THE DRAWINGS

Figure 1:
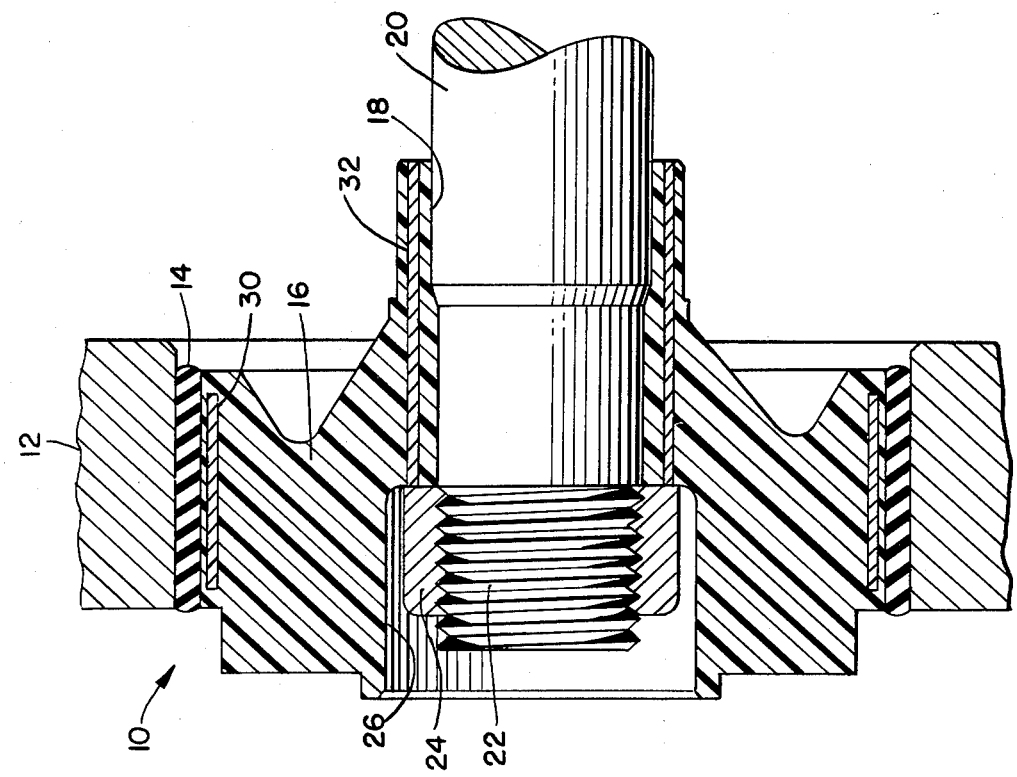
FIG. 1 is a cross-sectional view of a torsional vibration damper constructed in accordance with the practice of this invention.

Referring now to FIG. 1 of the drawings, the numeral 10 denotes generally a torsional vibration damper assembly and includes an outer inertia ring 12 conventionally formed of cast iron or other strong and heavy material. The numeral 14 denotes a continuous, elastomer ring whose outer surface is in contact with the inner surface of ring 12. The numeral 16 denotes a hub whose outer peripheral surface contacts the innermost surface of elastomer annulus 14. The numeral 18 denotes a central, through aperture in the hub, the aperture adapted to receive the end of a shaft 20. Conventionally, shaft 20 is provided with screw threads 22 at its end and a threaded nut 24 is turned so that one of its radially extending faces abuts the indicated portion of hub 16, to thereby draw the hub up into tight engagement with shaft 20. While not shown, a key may also be included in the assembly for the purpose of non-rotatably securing the hub to the shaft 20. Threaded portion 22 of the shaft and nut 24 may be located within a recess 26 of the hub. The elastomer may be bonded to both the inertia member 12 and the hub 16, as is conventional in this art.

In the absence of rigid hoop elements to be presently described, the plastic or other material from which the hub 16 is fashioned would undergo, with time, a phenomenon known as plastic creep. This would take place at the outer peripheral portion because of the radially inwardly directed force of elastomer 14. As is known to workers in the plastic field, continued force against a plastic element will eventually cause the element to yield and not to spring back. This is sometimes also termed plastic set and often occurs in a variety of materials. Further, axial forces on the hub adjacent its bore 18 occasioned by the force of nut 24 would also tend to result in creep or set. The term plastic in the claims is thus intended to embrace materials which, in addition to plastic, suffer change in dimension during extended periods of time due to application of forces, i.e., materials which lose their elasticity.

Such changes over long periods of time in the desired dimensional stability of hub 16 are inhibited by the elements now described. These elements are defined by a first flat, hoop member 30 and a second hoop element 32. Hoop 30 is embedded in the hub and is positioned just radially inwardly of the outermost peripheral surface of the hub. Within the scope of this invention, however, the hoop 30 may extend so as to define a portion of the outer peripheral surface of hub 16. The hoop is thus said to be contiguous to the outermost peripheral surface of the hub, i.e., either at or near that surface. The second hoop is positioned radially contiguous to bore 18 and the extent of this hoop 32 is substantially the axial extent of the hub from the nut 24 to the righthand end of the hub. The reader will immediately grasp that hoop 32 resists axial and radial forces occasioned by the clamping nut 24 and thus inhibits plastic set or creep near the hub aperture 18. Similarly, the first hoop 30 resists the radial forces of deformation and thereby inhibits plastic set or creep radially of the hub.

Figure 2:
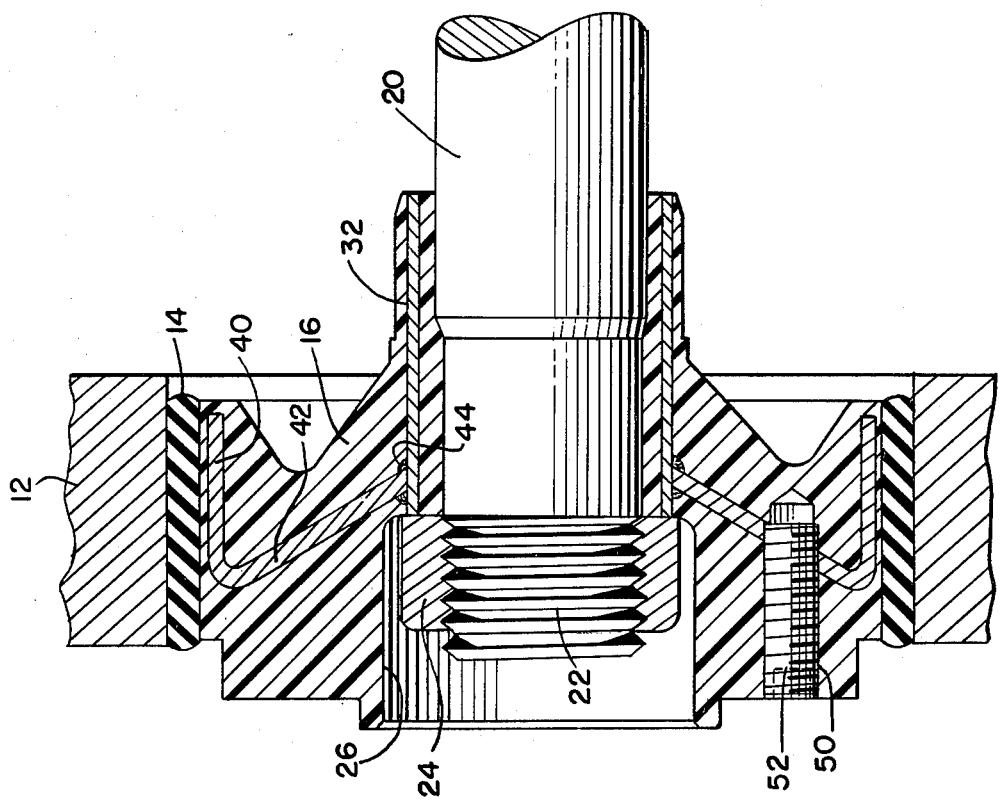
FIG. 2 is a view similar to FIG. 1 and illustrates a modification.

Referring now to FIG. 2 of the drawings, an embodiment of the invention is illustrated which employs a different type of outermost hoop. The inertia ring, the elastomer annulus and the hub, together with the second or radially innermost reinforcing hoop 32, are of the same construction as described with respect to the embodiment of FIG. 1. However, the outermost reinforcing hoop assumes a somewhat different configuration. The numeral 40 at FIG. 2 denotes a continuous annular hoop or ring, similar to hoop 30, one edge of which is connected to a radially inwardly and somewhat axially extending conical reinforcement 42. The reader will understand that reinforcement 42 is of continuous angular extent, as in the manner of a cone or funnel and is provided with apertures to establish continuity of the material which defines the hub 16. The radially innermost portion of cone reinforcement 42 is affixed, as by welding indicated by the numeral 44, to the inner hoop 32. Thus, the outermost rim of conical reinforcement 42 is integrally secured to one edge of hoop 40, while its rim of least diameter is rigidly secured to inner or second hoop 32. The numeral 50 indicates any one of a plurality of angularly spaced recesses having threads 52, the threads carried by the hub material and by portions of the cone reinforcement 42. Their function is to receive threaded fasteners to attach a pulley to an end face of the damper. The reinforcement 42 is also formed of metal, as hoops 30, 40, and 32, such as a steel or cast iron.

What is claimed is:

1. A torsional vibration damper of the type having an outer inertia ring, a radially intermediate elastomer annulus, and a centrally apertured, radially innermost hub, the hub adapted to be secured to the end of a rotary crankshaft subject to torsional vibrations, the hub formed of plastic to thereby reduce its polar moment of inertia and thereby reduce the parasitic mass of the entire damper, the improvement comprising, a first rigid hoop, the first hoop embedded in the hub and positioned contiguous to the outer peripheral surface of the hub, a second rigid hoop, the second hoop embedded in the hub and positioned contiguous to the surface of the central hub aperture which is adapted to receive the end of a crankshaft, the second hoop being of an axial extent substantially equal to the axial extent of the crankshaft receiving aperture of the hub, whereby the first hoop resists creep of the hub due to radially inwardly directed force of the said intermediate elastomer annulus and whereby the second hoop resists radial and clamping forces occasioned by attachment of the hub to a crankshaft.

2. The damper of claim 1 wherein the axial extent of the first hoop is substantially equal to the axial extent of the elastomer-hub interface.

3. The damper of claim 1 wherein the central axes of the two said hoops are concident with the damper axis of rotation.

4. The damper of claim 1 wherein the first hoop is provided with a conical reinforcement, the conical reinforcement being rigidly secured at its rim of greatest diameter to one edge of the first hoop, the conical reinforcement being rigidly secured at its rim of least diameter to the second hoop.

5. The damper of claim 4 wherein the central axes of the two said hoops are concident with the damper axis of rotation.

6. The damper of claim 4 wherein the first hoop and the conical reinforcement are integral.

7. The damper of claim 6 wherein the rim of least diameter of the conical reinforcement is secured to the second hoop by welding.

* * * * *

UNITED STATES PATENT AND TRADEMARK OFFICE
CERTIFICATE OF CORRECTION

PATENT NO. : 4,178,811

DATED : December 18, 1979

INVENTOR(S) : Michael Shepherd

It is certified that error appears in the above-identified patent and that said Letters Patent are hereby corrected as shown below:

In the title, "META" should read -- METAL --.

Signed and Sealed this

Twenty-fifth Day of March 1980

[SEAL]

Attest:

SIDNEY A. DIAMOND

Attesting Officer  Commissioner of Patents and Trademarks